(12) United States Patent
Kwasniewski

(10) Patent No.: US 10,865,934 B2
(45) Date of Patent: Dec. 15, 2020

(54) MOBILE DEVICE MOUNT

(71) Applicant: Jonathan Caleb Kwasniewski, Denver, CO (US)

(72) Inventor: Jonathan Caleb Kwasniewski, Denver, CO (US)

( * ) Notice: Subject to any disclaimer, the term of this patent is extended or adjusted under 35 U.S.C. 154(b) by 0 days.

(21) Appl. No.: 16/210,256

(22) Filed: Dec. 5, 2018

(65) Prior Publication Data

US 2019/0195417 A1    Jun. 27, 2019

Related U.S. Application Data

(60) Provisional application No. 62/608,731, filed on Dec. 21, 2017.

(51) Int. Cl.
| | | |
|---|---|---|
| *F16M 11/06* | (2006.01) | |
| *F16M 11/04* | (2006.01) | |
| *H04M 1/04* | (2006.01) | |
| *F16M 11/12* | (2006.01) | |
| *F16M 13/02* | (2006.01) | |
| *F16M 11/20* | (2006.01) | |
| *F16M 11/10* | (2006.01) | |
| *B60R 11/02* | (2006.01) | |
| *B60R 11/00* | (2006.01) | |

(52) U.S. Cl.
CPC ........... *F16M 11/041* (2013.01); *B60R 11/02* (2013.01); *F16M 11/10* (2013.01); *F16M 11/105* (2013.01); *F16M 11/12* (2013.01); *F16M 11/2064* (2013.01); *F16M 13/022* (2013.01); *H04M 1/04* (2013.01); *B60R 2011/0026* (2013.01); *B60R 2011/0089* (2013.01); *F16M 11/06* (2013.01); *F16M 2200/022* (2013.01); *F16M 2200/024* (2013.01); *F16M 2200/06* (2013.01)

(58) Field of Classification Search
USPC .......... 248/121, 122.1, 123.11, 123.2, 124.1, 248/125.8, 125.9, 133, 136, 139, 144, 248/145, 149, 150, 151, 176.1, 178.1, 248/183.2, 186.1, 186.2, 187.1, 176.3; 269/55, 71, 73, 45, 3, 6
See application file for complete search history.

(56) References Cited

U.S. PATENT DOCUMENTS

| | | | | |
|---|---|---|---|---|
| 7,310,116 B2* | 12/2007 | Lee | .......... | H04N 1/195 |
| | | | | 248/187.1 |
| 7,413,152 B1* | 8/2008 | Chen | ...... | F16M 11/10 |
| | | | | 16/233 |
| 2011/0127392 A1* | 6/2011 | Carter | ............ | F16M 11/38 |
| | | | | 248/121 |

(Continued)

*Primary Examiner* — Alfred J Wujciak

(57) ABSTRACT

A mobile device mount consists of a mounting section, an arm-orienting base, a device-attaching section, a first arm link, a second arm link, a rotating mechanism, and an attachment mechanism. A mobile device is attached to the device-attaching section. The attachment mechanism allows the device-attaching section to be detached when required. The first arm link and the second arm link establish a connection between the mounting section and the device-attaching section. The second arm link is rotatably connected to the arm-orienting base through the rotating mechanism allowing varying positions for the mobile device. The mounting section can vary in order to interface with various mounting surfaces.

14 Claims, 16 Drawing Sheets

(56) References Cited

U.S. PATENT DOCUMENTS

| | | | | |
|---|---|---|---|---|
| 2014/0226281 A1* | 8/2014 | Emami | ................ | F16M 11/105 |
| | | | | 361/679.56 |
| 2015/0034778 A1* | 2/2015 | Lin | ........................ | F16M 11/16 |
| | | | | 248/124.1 |
| 2015/0369418 A1* | 12/2015 | Wong | ................... | F16M 11/041 |
| | | | | 248/372.1 |
| 2019/0024843 A1* | 1/2019 | Lau | ........................ | F16M 11/10 |

* cited by examiner

MOBILE DEVICE MOUNT

The current application claims a priority to the U.S. Provisional Patent application Ser. No. 62/608,731 filed on Dec. 21, 2017.

FIELD OF THE INVENTION

The present invention relates generally to a device mount that can be used with a variety of devices. By utilizing the present invention, the user can position a mobile device in a plurality of positions and mount the mobile device to a variety of surfaces.

BACKGROUND OF THE INVENTION

Mobile devices are being used for a variety of purposes today. Among the plethora of functionalities available with mobile devices, viewing driving directions, capturing pictures, and recording video are some of the most useful functionalities. For practical reasons and safety reasons, mobile devices are usually utilized with a mount that holds the mobile device at an accessible distance. Even though existing mounts are useful to fulfill certain functionalities, there are some notable drawbacks as well.

The inability to be used with varying mobile devices is a major disadvantage of existing mounts. For instance, if a mount is initially used to hold a mobile phone, the same mount cannot be reconfigured to hold a tablet computer. Thus, the user has to utilize one mount for the mobile phone and another mount for the tablet computer. The need to have multiple mounts for each of the available devices can be financially disadvantageous to the user. Furthermore, the need to carry multiple mounts can be inconvenient to the user.

The inability to mount onto a variety of surfaces is another disadvantage with existing mounts. As an example, a mount that utilizes a suction cup to mount onto a windscreen may not be able to use the same suction cup to mount onto a softer surface. In another instance, the suction cup mount may not be used on a surface that is not planar.

A majority of existing mounts are unable to rotate in a 360-degree angle. Thus, if the mobile device attached to the mount needs to be reoriented, the mount needs to be repositioned as well. The need to consistently reposition the mounting position can be inconvenient to the user.

The objective of the present invention is to address the aforementioned issues. In particular, the present invention introduces a device mount that can be used to hold a variety of devices that can be, but is not limited to, a mobile phone or a tablet computer. In different embodiments, the present invention can also be used to hold action cameras and other comparable devices. The present invention can mount onto planar and non-planar surfaces and redirect an attached mobile device to a preferred angle. More specifically, the present invention provides the user a universal mount for varying devices and mounting surfaces.

DETAIL DESCRIPTIONS OF THE INVENTION

All illustrations of the drawings are for the purpose of describing selected versions of the present invention and are not intended to limit the scope of the present invention.

The present invention is a device mount that can be used with a plurality of mobile devices and be attached to a plurality of external surfaces. The present invention is equipped with the ability to rotate in a 360-degree range so that the attached mobile device can be positioned at any preferred angle.

Figure 11:
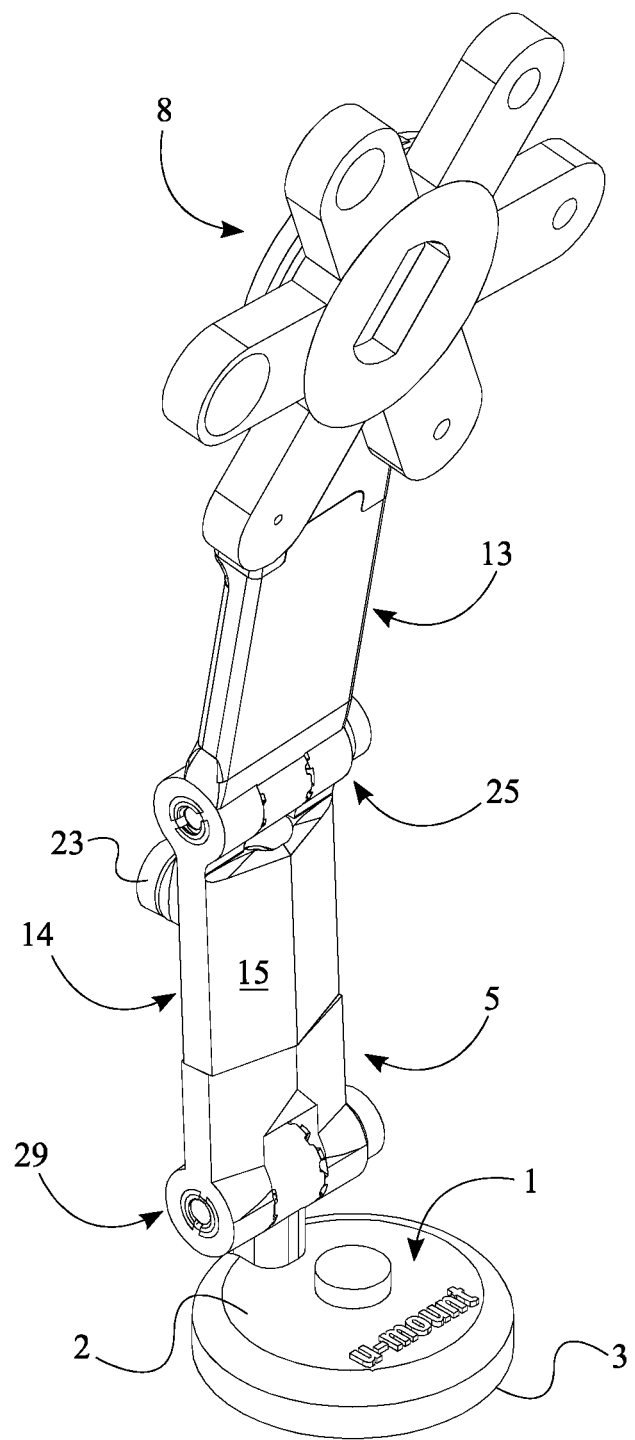
FIG. 11 is a perspective view of the present invention, wherein an external attachment is attached to the device-attaching section.

As illustrated in FIGS. 1-4, to fulfill the intended functionalities, the present invention comprises a mounting section 1, a device-attaching section 8, an arm-orienting base 5, a first arm link 13, a second arm link 14, a rotating mechanism 18, and an attachment mechanism 22. The mounting section 1, which can vary in size and shape in different embodiments of the present invention, is used to mount the present invention onto an external surface which can vary. In one instance, the external surface can be a windscreen of an automobile. In another instance, the external surface can be a handle bar of a bicycle. Thus, in different embodiments of the present invention, the overall shape and size of the mounting section 1 can vary according to the external surface the present invention is being mounted onto. The mobile device used with the present invention can be, but is not limited to, a mobile phone or a tablet computer, and is attached to the device-attaching section 8. As seen in FIG. 11, the size and overall shape of the device-attaching section 8 can vary in different embodiments of the present invention according to the device that is being attached to the present invention. To alternate according to the mobile device that is being attached, the device-attaching section 8 is removably attached through the attachment mechanism 22. The first arm link 13 and the second arm link 14 are used to position the mobile device in an extended position. The positioning angle of the mobile device attached to the present invention is adjusted via the arm-orienting base 5 and the rotating mechanism 18.

Figure 1A:
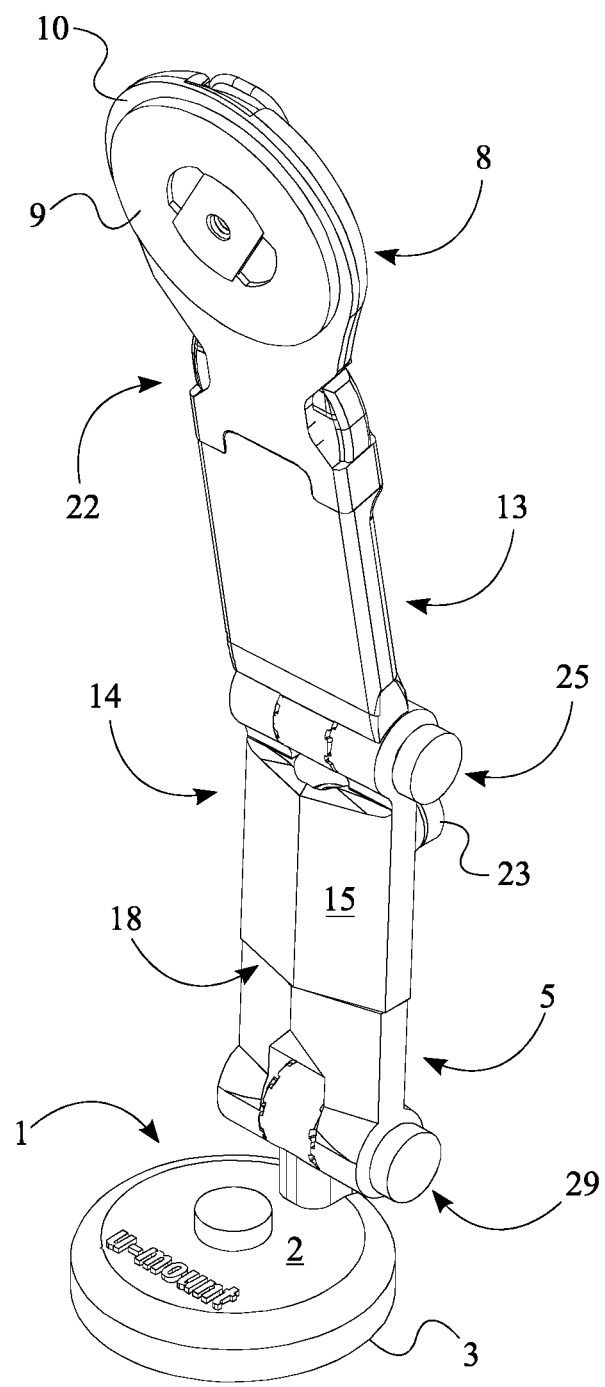
FIG. 1A is a perspective view of the present invention.
Figure 1B:
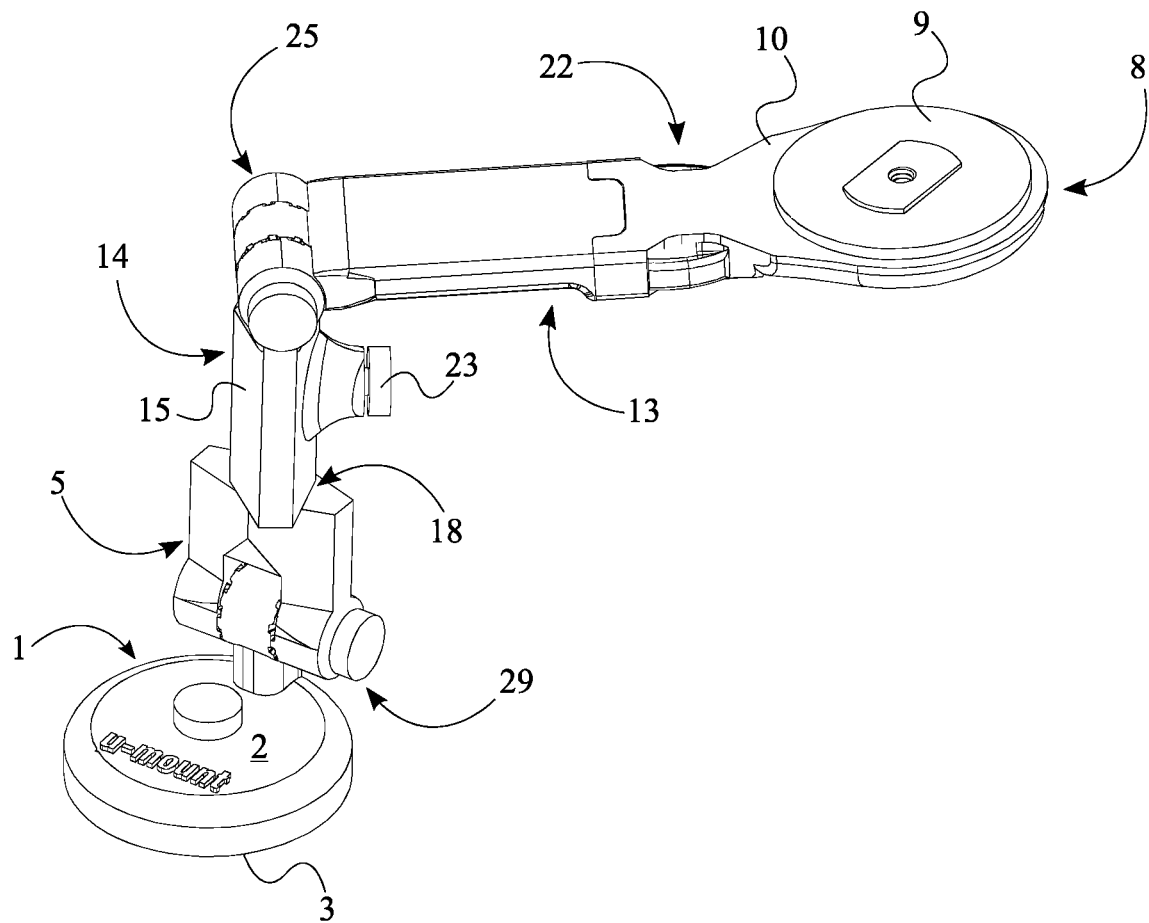
FIG. 1B is another perspective view of the present invention, wherein the arm-hinging mechanism and the rotating mechanism are utilized.
Figure 2:
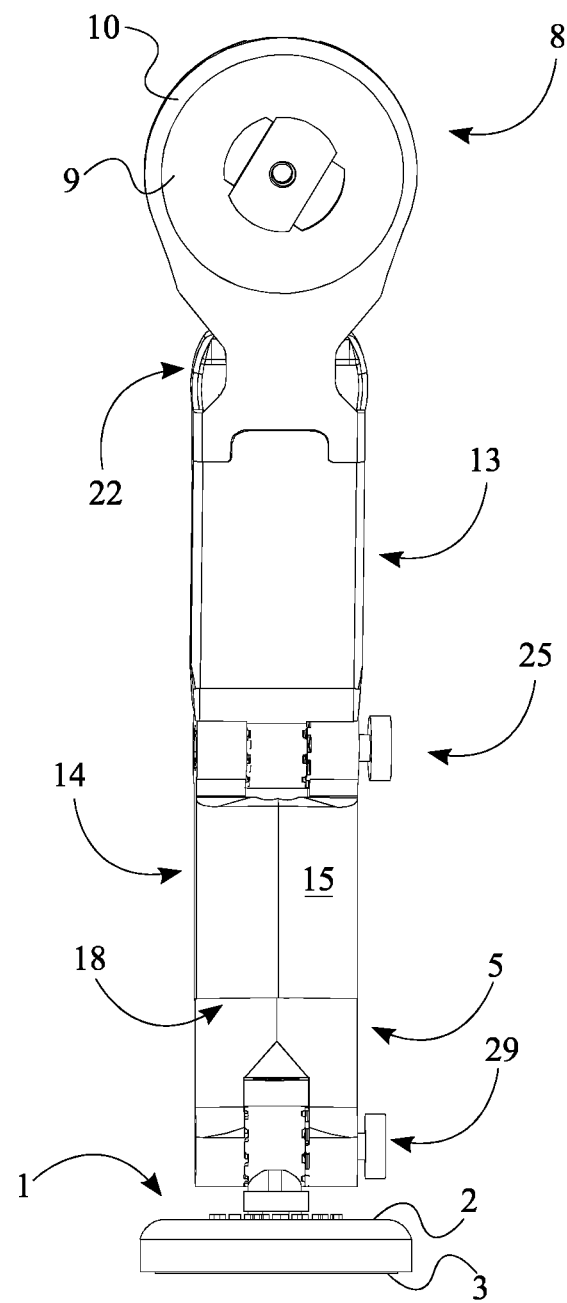
FIG. 2 is a front view of the present invention.
Figure 3:
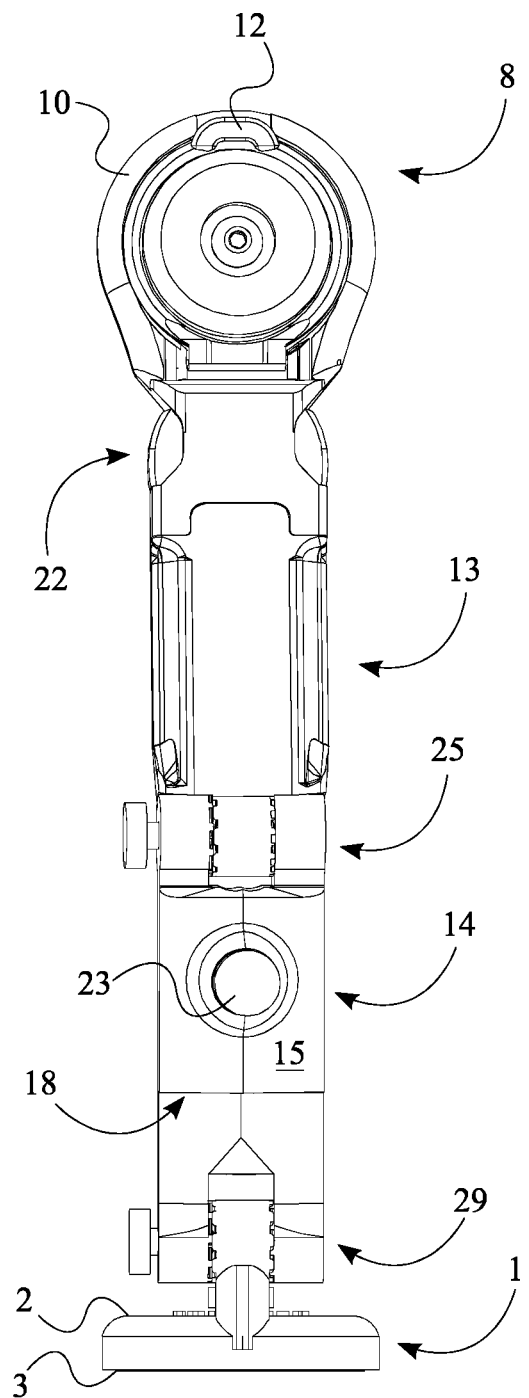
FIG. 3 is a rear view of the present invention.
Figure 4:
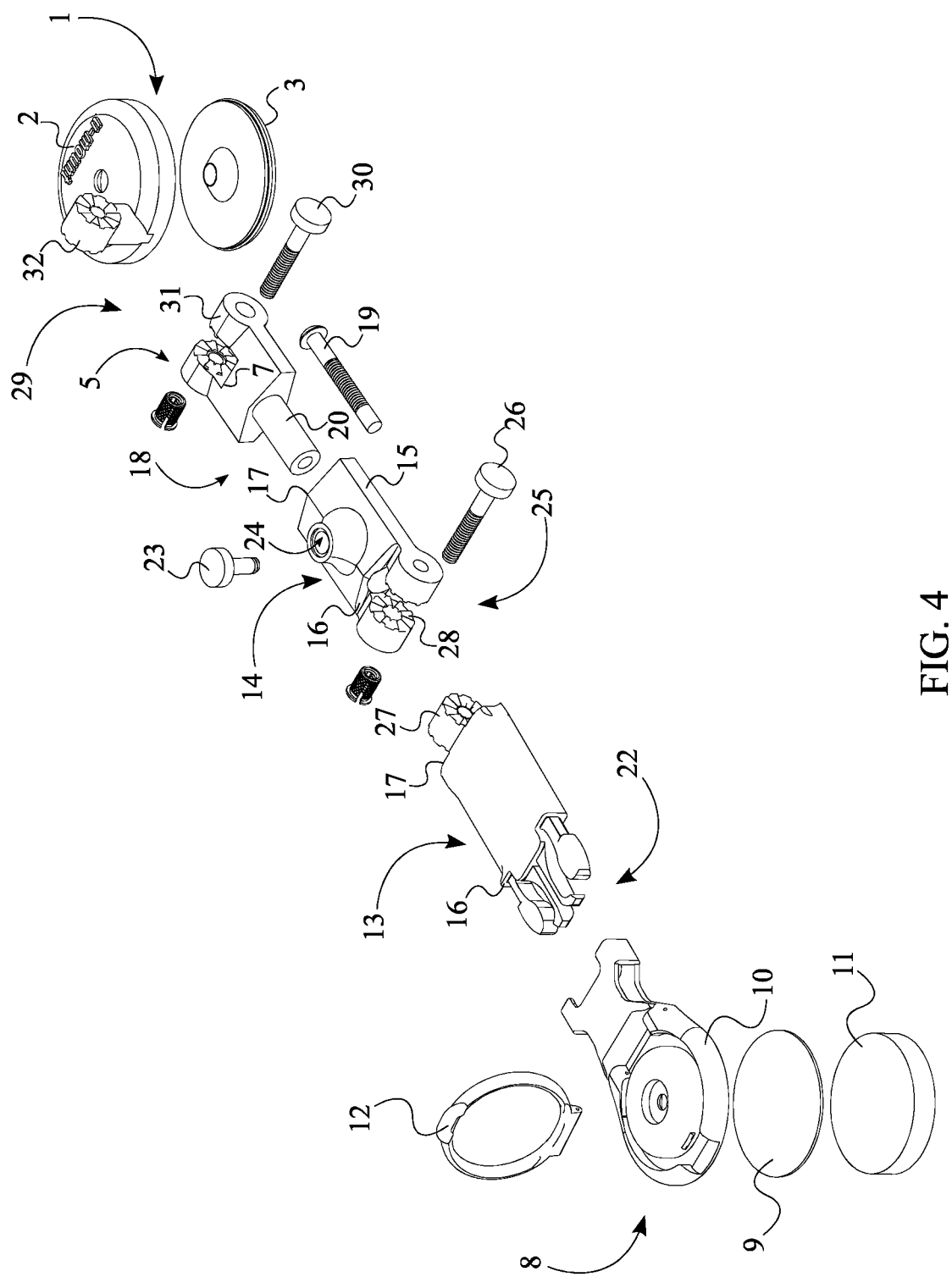
FIG. 4 is an exploded view of the present invention.

The distance from the mounting surface to the mobile device is determined by the first arm link 13 and the second arm link 14. As seen in FIG. 4, both the first arm link 13 and the second arm link 14 each comprise a first end 16 and a second end 17, wherein a distance from the first end 16 to the second end 17 determines the overall length of either the first arm link 13 or the second arm link 14. In the preferred embodiment of the present invention, the first arm link 13 and the second arm link 14 are equal in length. However, the length of the first arm link 13 can be different from the length of the second arm link 14 in other embodiments of the present invention. The second end 17 of the first arm link 13 is hingedly connected to the first end 16 of the second arm link 14 through an arm-hinging mechanism 25. Thus, the first arm link 13 can be positioned at varying angles from the second arm link 14.

Figure 6:
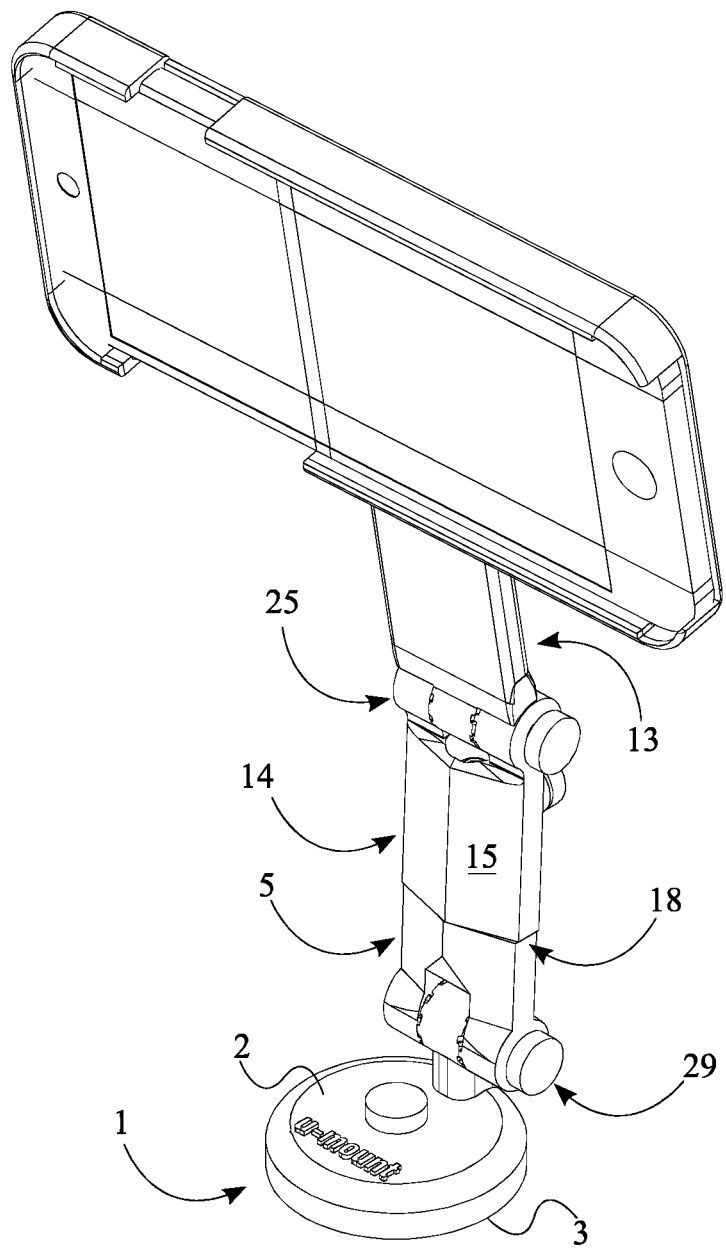
FIG. 6 is a perspective view of the present invention, wherein a mobile phone is attached to the device-attaching section.
Figure 7:
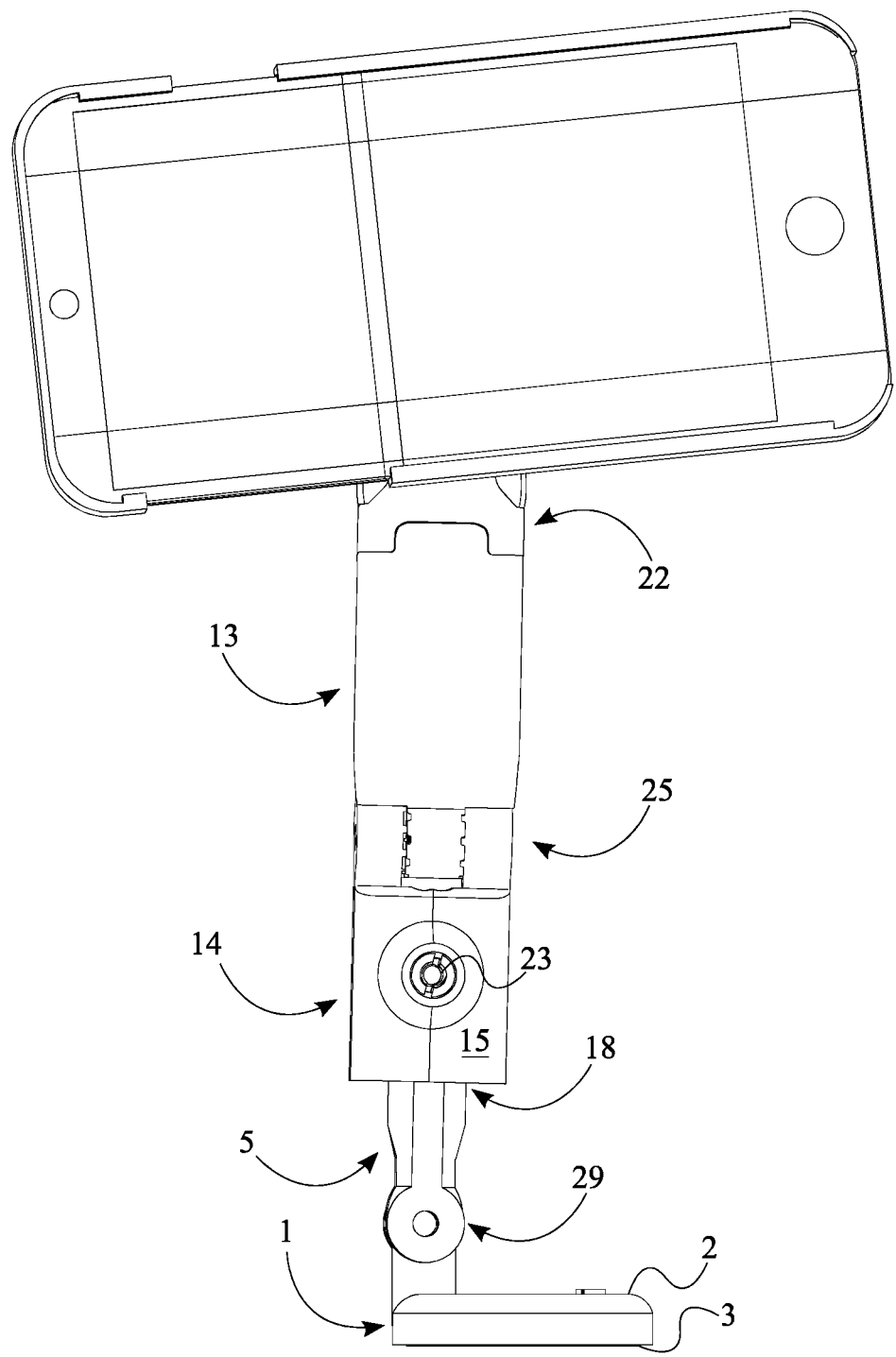
FIG. 7 is a side view of the present invention, wherein the mobile phone is attached to the device-attaching section and the rotating mechanism is utilized.

As seen in FIG. 6 and FIG. 7, to allow the user to rotate the attached mobile device in a 360-degree range, the second end 17 of the second arm link 14 is rotatably connected to the arm-orienting base 5 through the rotating mechanism 18, wherein the rotating mechanism 18 can vary in different embodiments of the present invention. Furthermore, to prevent the arm-orienting base 5 from rotating with the second arm link 14, the arm-orienting base 5 is hingedly and removably attached to the mounting section 1 which remains stationary. By being removably attached, the user can switch the mounting section 1 according to the surface. Since the mounting section 1 remains stationary, the arm-orienting base 5 that is connected also remains stationary. The overall connection between the second arm link 14, the arm-orienting base 5, and the mounting section 1 allows the second arm link 14 to rotate about the arm-orienting base 5 that is stationary. In the resulting position, the second arm link 14 is connected to the arm-orienting base 5 opposite the mounting section 1.

Figure 8:
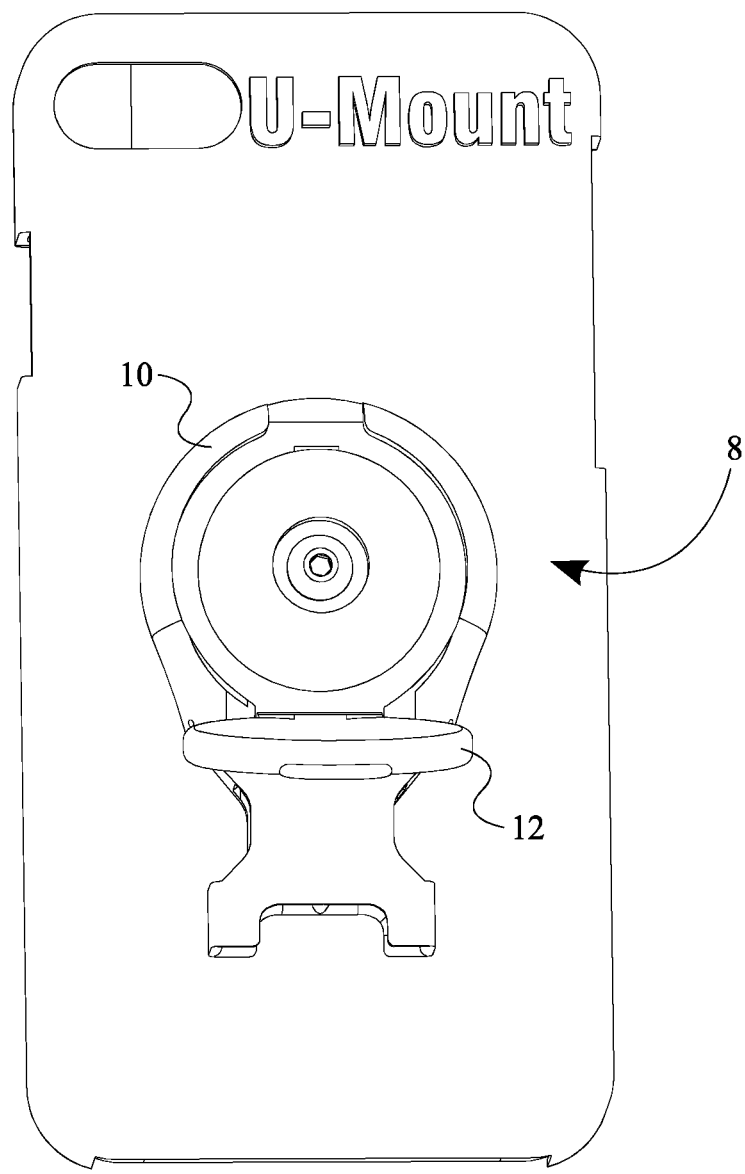
FIG. 8 is a top view of the device-attaching section, wherein the kickstand is extended.

As discussed earlier, the mobile device or other comparable device that is being used with the present invention is attached to the device-attaching section 8. As seen in FIG. 4 and FIG. 8, to accommodate varying mobile devices, the device-attaching section 8 is removably attached to the first end 16 of the first arm link 13 through the attachment mechanism 22. Thus, by managing the attachment mechanism 22, the user can vary the device-attaching section 8 to receive a preferred mobile device. The attachment mechanism 22 can vary in different embodiments of the present invention. As illustrated in FIG. 4, in the preferred embodiment of the present invention, the attachment mechanism 22 is a side-release buckle mechanism.

Figure 5:
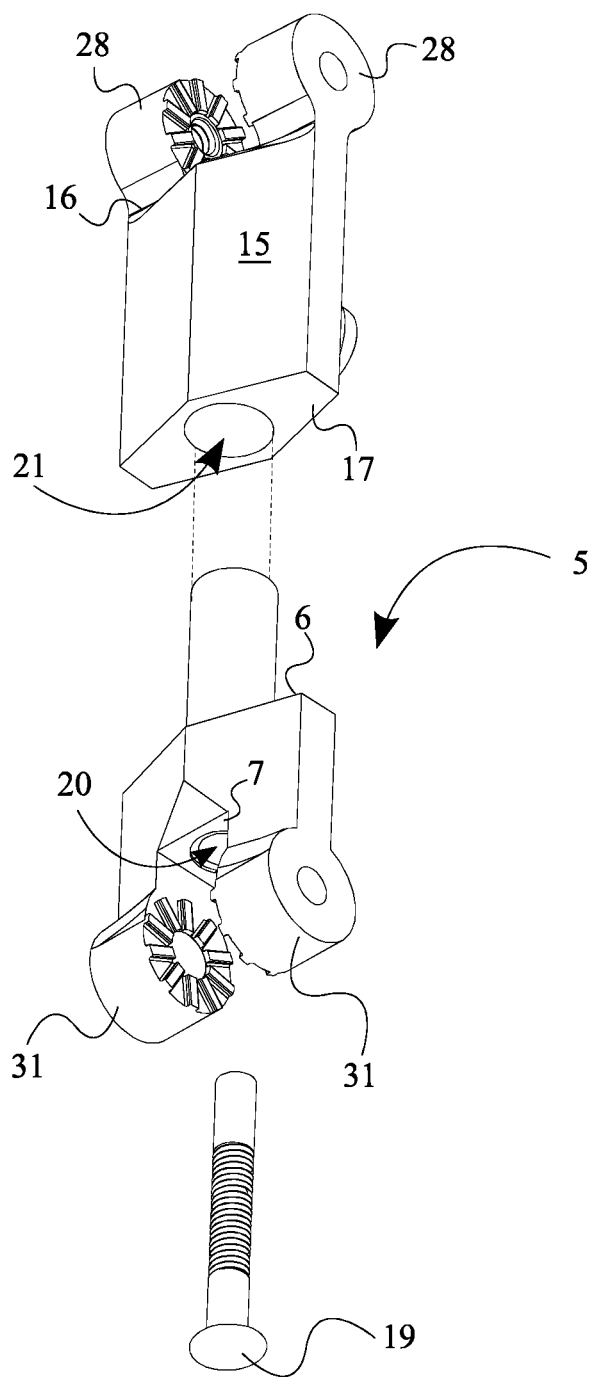
FIG. 5 is an exploded bottom perspective view of the arm-orienting base and the second arm link.
Figure 13:
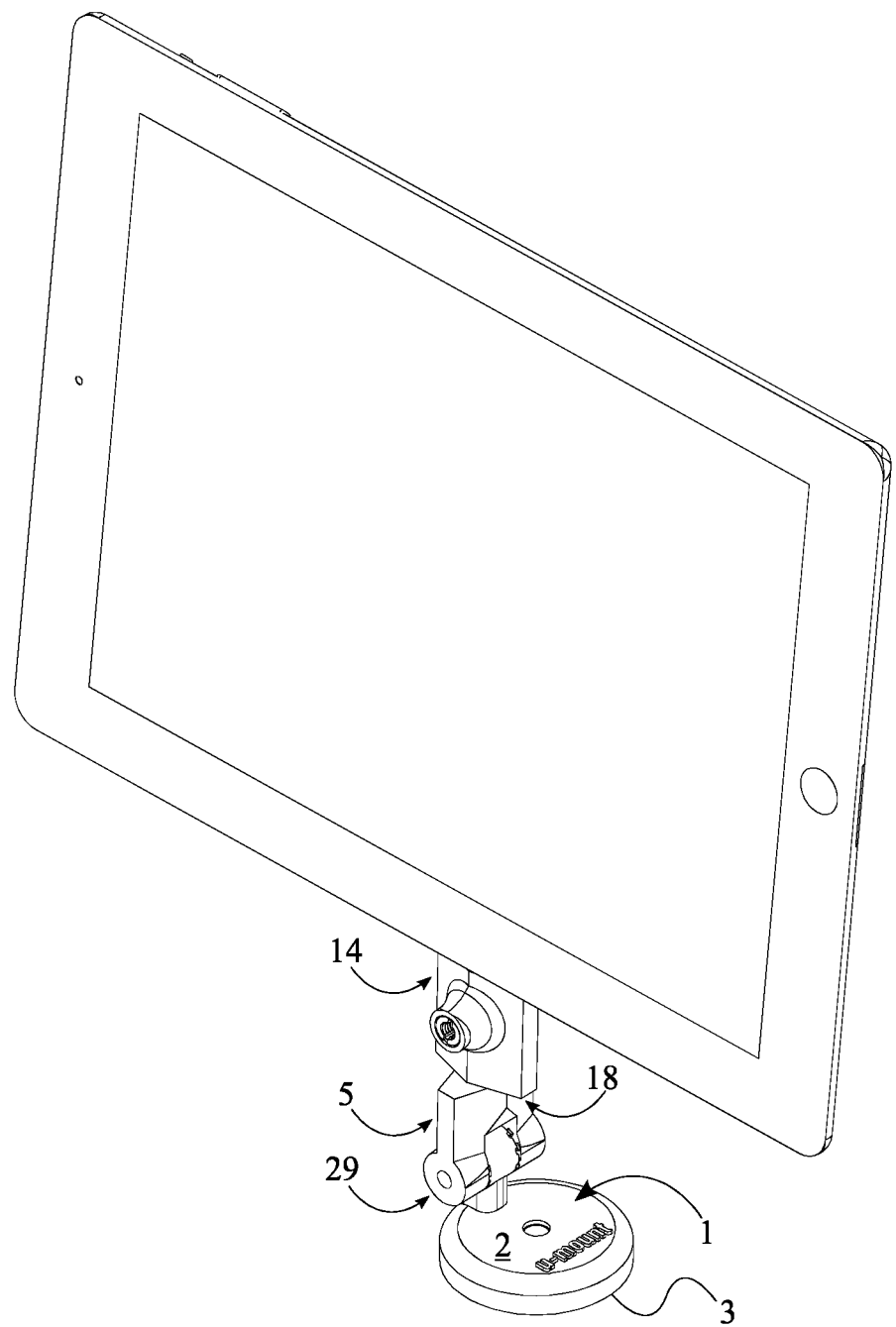
FIG. 13 is a perspective view of the present invention, wherein the rotating mechanism is illustrated.

As further illustrated in FIG. 13, the second arm link 14 is rotatably connected to the arm-orienting base 5 through the rotating mechanism 18 which can vary in different embodiments of the present invention. As shown in FIG. 4 and FIG. 5, in the preferred embodiment of the present invention, the rotating mechanism 18 comprises an engagement screw 19, a screw-positioning tube 20, and a tube-receiving channel 21. The engagement screw 19 allows the user to lock the second arm link 14 at a preferred angle via a locking mechanism. The screw-positioning tube 20, which is used to position the engagement screw 19, traverses through a structural body of the arm-orienting base 5 from a proximal end 6 to a distal end 7 of the arm-orienting base 5. More specifically, the screw-positioning tube 20 extends through a length of the arm-orienting base 5 and extends outwards from the proximal end 6 of the arm-orienting base 5. The engagement screw 19 is positioned into the screw-positioning tube 20 at the distal end 7. To establish a connection between the arm-orienting base 5 and the second arm link 14, the tube-receiving channel 21 traverses into a structural body 15 of the second arm link 14 at the second end 17 of the second arm link 14. By concentrically aligning the screw-positioning tube 20 with the tube-receiving channel 21 and positioning the screw-positioning tube 20 into the tube-receiving channel 21, the engagement screw 19 can be positioned into both the screw-positioning tube 20 and the tube-receiving channel 21.

As mentioned earlier, a locking mechanism is used to secure the engagement screw 19 and thus, position the mobile device at a preferred angle. As seen in FIG. 4, in the preferred embodiment, the present invention further comprises a locking screw 23 and a lock screw-receiving channel 24 that are used to lock the engagement screw 19 at a preferred angle. The lock screw-receiving channel 24, which is used to hold the locking screw 23, perpendicularly traverses into the structural body 15 of the second arm link 14 in between the first end 16 and the second end 17. In the resulting position, the lock screw-receiving channel 24 is positioned perpendicular to the tube-receiving channel 21. Thus, when the locking screw 23 is positioned into the lock screw-receiving channel 24, the locking screw 23 can be used to halt the rotational movement of the engagement screw 19. More specifically, the perpendicular positioning allows the locking screw 23 to be pressed against the engagement screw 19 so that the rotational movement of the engagement screw 19 is halted.

Figure 14:
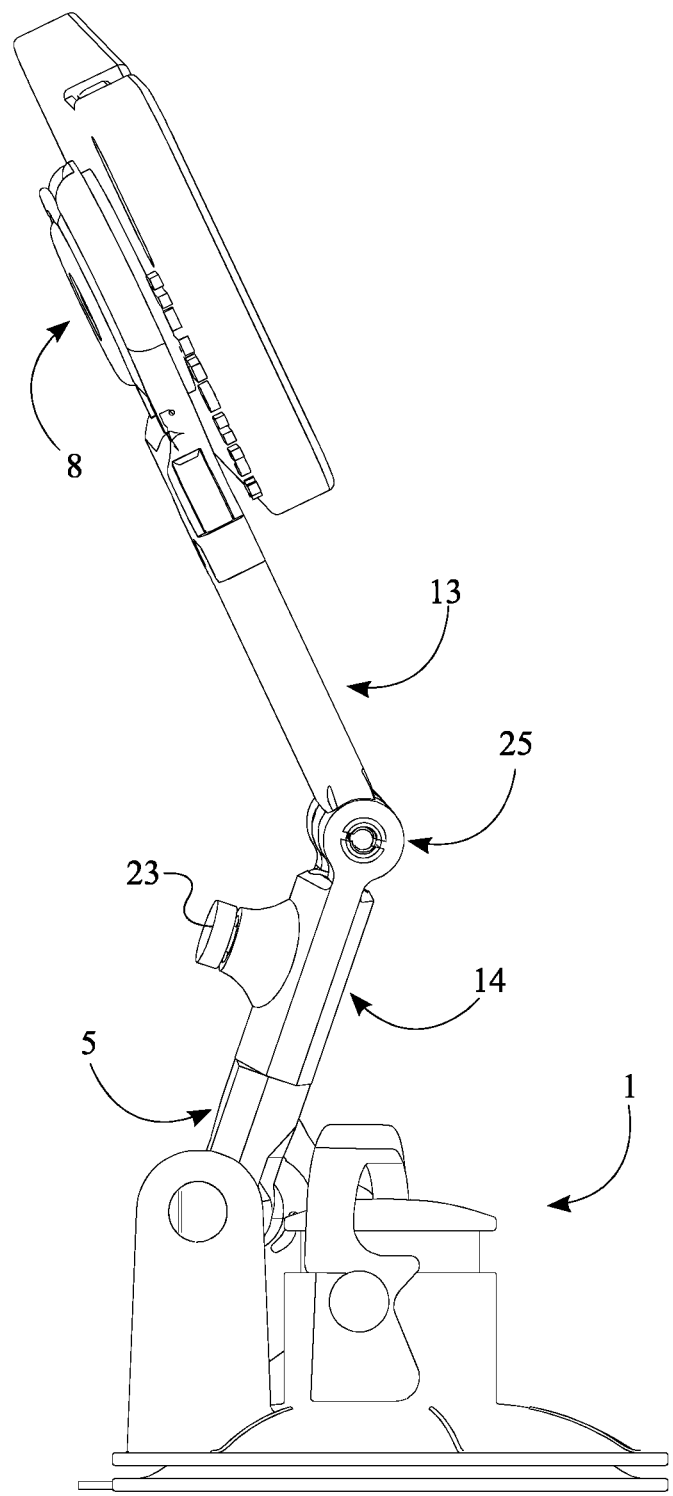
FIG. 14 is a side view of the present invention, wherein the arm-hinging mechanism and a suction cup mount are illustrated.
Figure 15:
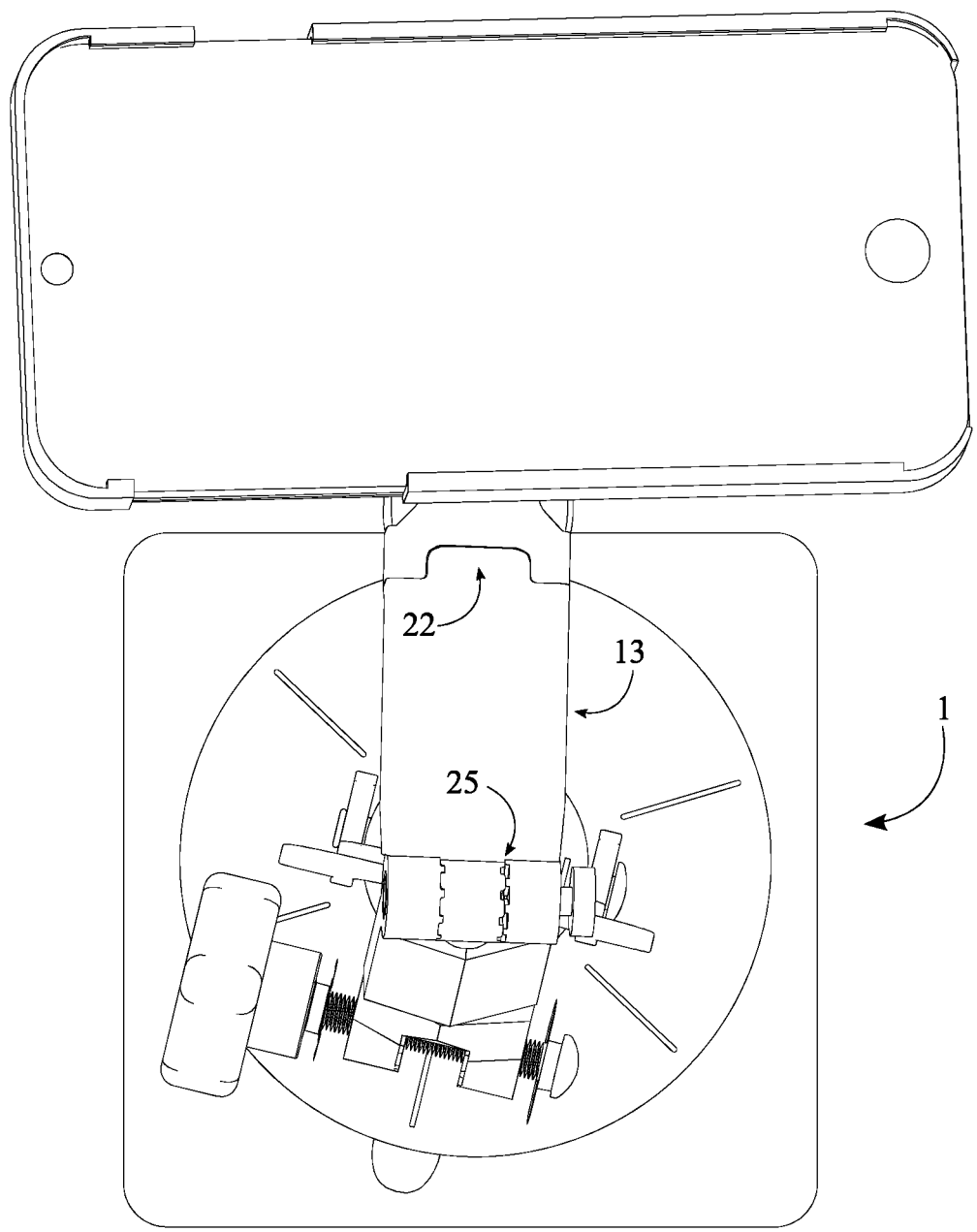
FIG. 15 is a top view of the present invention, wherein the arm-hinging mechanism and the suction cup mount are illustrated.

As illustrated in FIG. 14 and FIG. 15, the present invention further comprises an arm-hinging mechanism 25 that is used to position the first arm link 13 at varying angles from the second arm link 14. More specifically, the second end 17 of the first arm link 13 is hingedly connected to the first end 16 of the second arm link 14 through the arm-hinging mechanism 25 that can vary in different embodiments of the present invention. As seen in FIG. 4, in the preferred embodiment of the present invention, the arm-hinging mechanism 25 comprises a first pin 26, at least one first hinge knuckle 27, and at least one second hinge knuckle 28. The at least one first hinge knuckle 27 is terminally connected at the second end 17 of the first arm link 13. To correspond with the at least one first hinge knuckle 27, the at least one second hinge knuckle 28 is terminally connected at the first end 16 of the second arm link 14. The at least one first hinge knuckle 27 is concentrically aligned with the at least one second hinge knuckle 28 so that the first pin 26 can be positioned through the at least one first hinge knuckle 27 and the at least one second hinge knuckle 28.

To provide additional range of movement, the present invention further comprises a base hinging mechanism 29 which is used to hingedly connect the arm-orienting base 5 to the mounting section 1. As further illustrated in FIG. 4, in the preferred embodiment of the present invention, the base hinging mechanism 29 comprises a second pin 30, at least one third hinge knuckle 31, and at least one fourth hinge knuckle 32. The at least one third hinge knuckle 31 is terminally connected at a distal end 7 of the arm-orienting base 5. On the other hand, the at least one fourth hinge knuckle 32 is mounted onto a top surface 2 of the mounting section 1. To position the second pin 30 and complete a hinged connection, the at least one third hinge knuckle 31 is concentrically aligned with the at least one fourth hinge knuckle 32. When appropriately positioned, the second pin 30 is positioned through the at least one third hinge knuckle 31 and the at least one fourth hinge knuckle 32.

Figure 9:
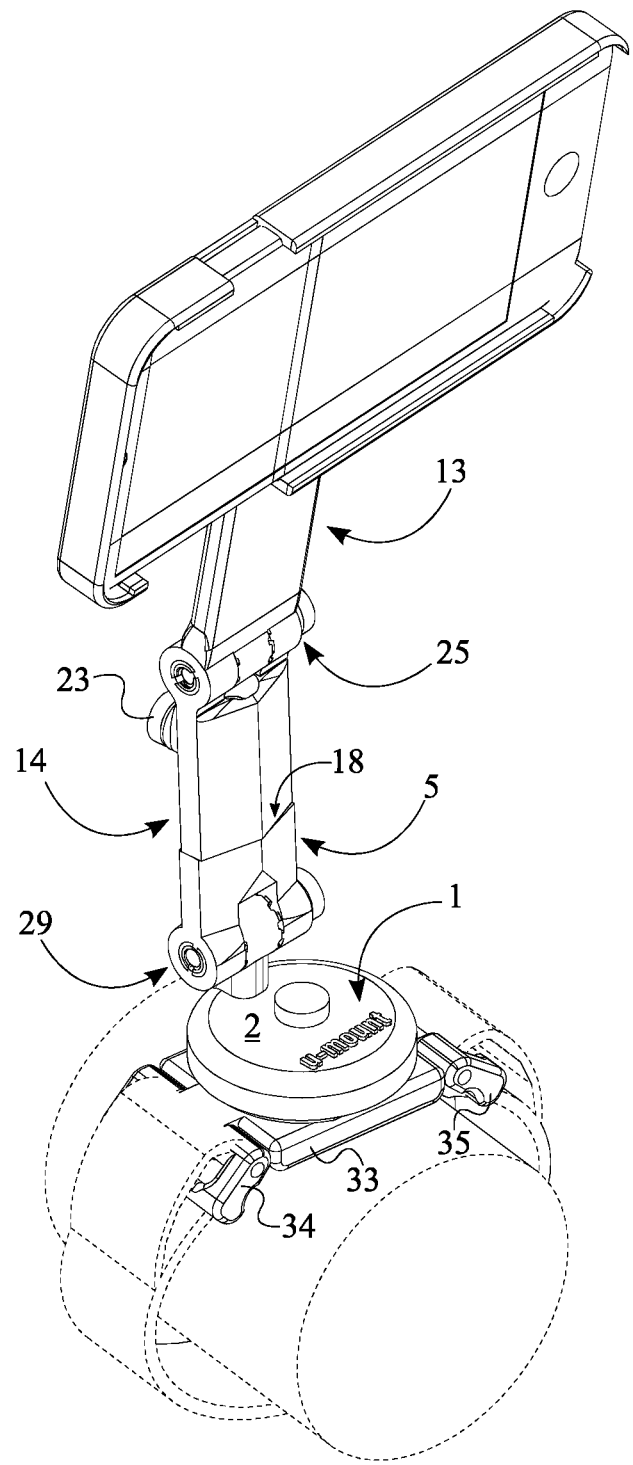
FIG. 9 is a perspective view of the present invention, wherein the mounting section is attached to a mounting panel.
Figure 10:
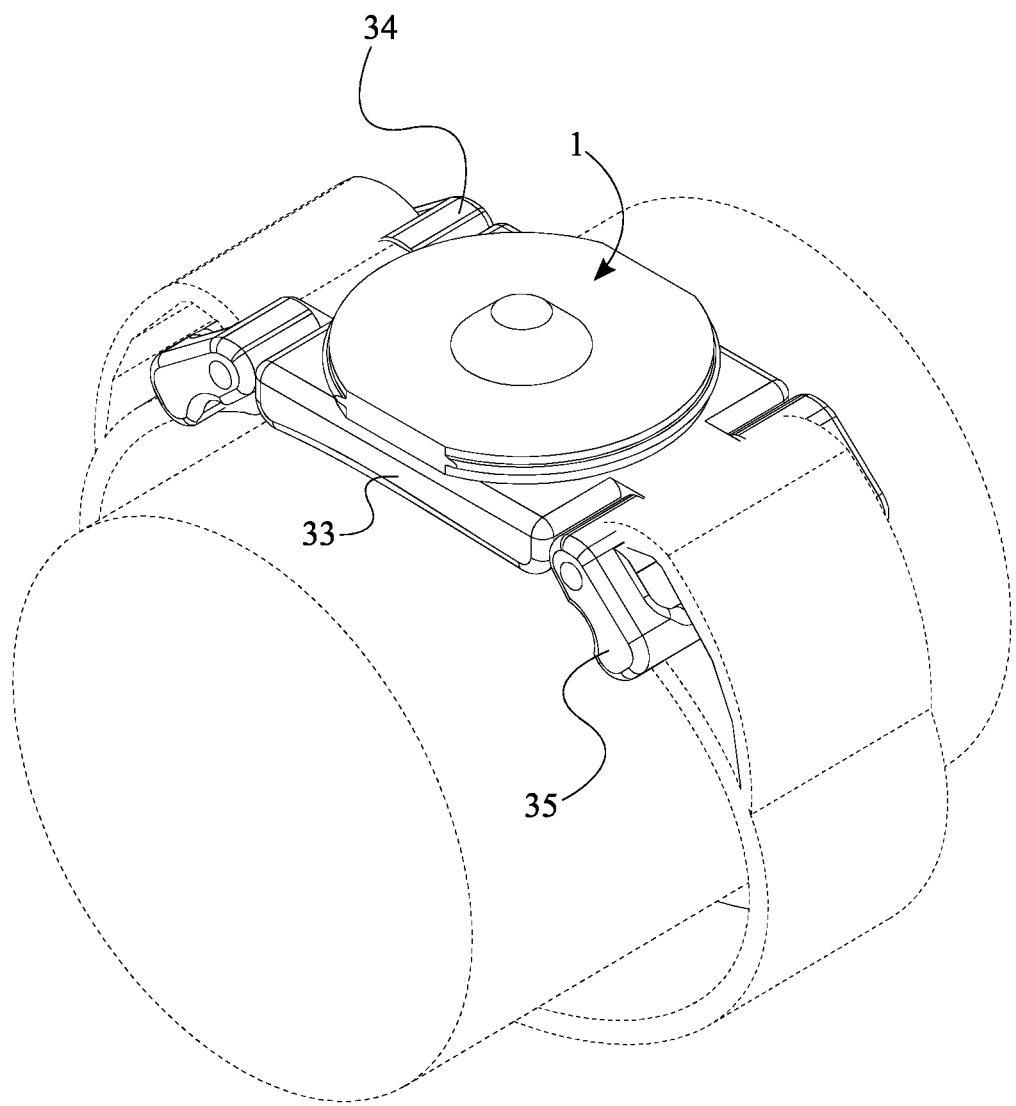
FIG. 10 is a perspective view of the mounting section being attached to a mounting panel.

As discussed before, the present invention can be mounted to a variety of surfaces. As seen in FIG. 9 and FIG. 10, to allow the user to attach the present invention to a non-planar surface or a circular surface such as a handle bar of a bicycle, the present invention further comprises a mounting panel 33, a first strap-receiving slot 34, and a second strap-receiving slot 35. The first strap-receiving slot 34 is laterally connected to the mounting panel 33. The second strap-receiving slot 35 is laterally connected to the mounting panel 33 opposite the first strap-receiving slot 34. In the resulting configuration, the mounting panel 33 is positioned in between the first strap-receiving slot 34 and the second strap-receiving slot 35. The first strap-receiving slot 34 and the second strap-receiving slot 35 are used to receive a fastening strap that is positioned around the circular surface or comparable non-planar surface. After the fastening strap is positioned through the first strap-receiving slot 34, around the circular mounting surface, and through the second strap-receiving slot 35, the mounting panel 33 is removably attached to a bottom surface 3 of the mounting section 1. When the mounting section 1 is secured with the mounting panel 33, the user can utilize the arm-orienting base 5, the first arm link 13, the second arm link 14, and the device-attaching section 8 to position the mobile device as preferred. As an example, the circular mounting surface can be a handlebar of a bicycle and the mobile device attached to the device-attaching section 8 can be an action camera. Thus, by utilizing the present invention, the user can record activity while riding the bicycle.

In addition to being used with multiple mounting surfaces, the present invention can also be attached to varying mobile devices. As seen in FIG. 13 and FIG. 14, the mobile device used with the present invention can be, but is not limited to, a mobile phone, an action camera, or a tablet computer. As seen in FIGS. 1-4, wherein a mobile phone is used with the present invention, the device-attaching section 8 comprises an attachment plate 9, an attaching body 10, and a kickstand ring 12. The attachment plate 9, which attaches to the mobile phone, is mounted onto the attaching body 10. The kickstand ring 12 is hingedly connected to the attaching body 10 opposite the attachment plate 9. As shown in FIG. 8, when the mobile phone is attached to the attachment plate 9, and the device-attaching section 8 is detached from the first arm link 13, the kickstand ring 12 can be used to hold the mobile phone in an upright position. As seen in FIG. 7, in another embodiment of the present invention, the attachment plate 9 can be rotatably mounted onto the attaching body 10 so that the mobile phone can be rotated to a preferred position while being attached to the device-attaching section 8.

Figure 12:
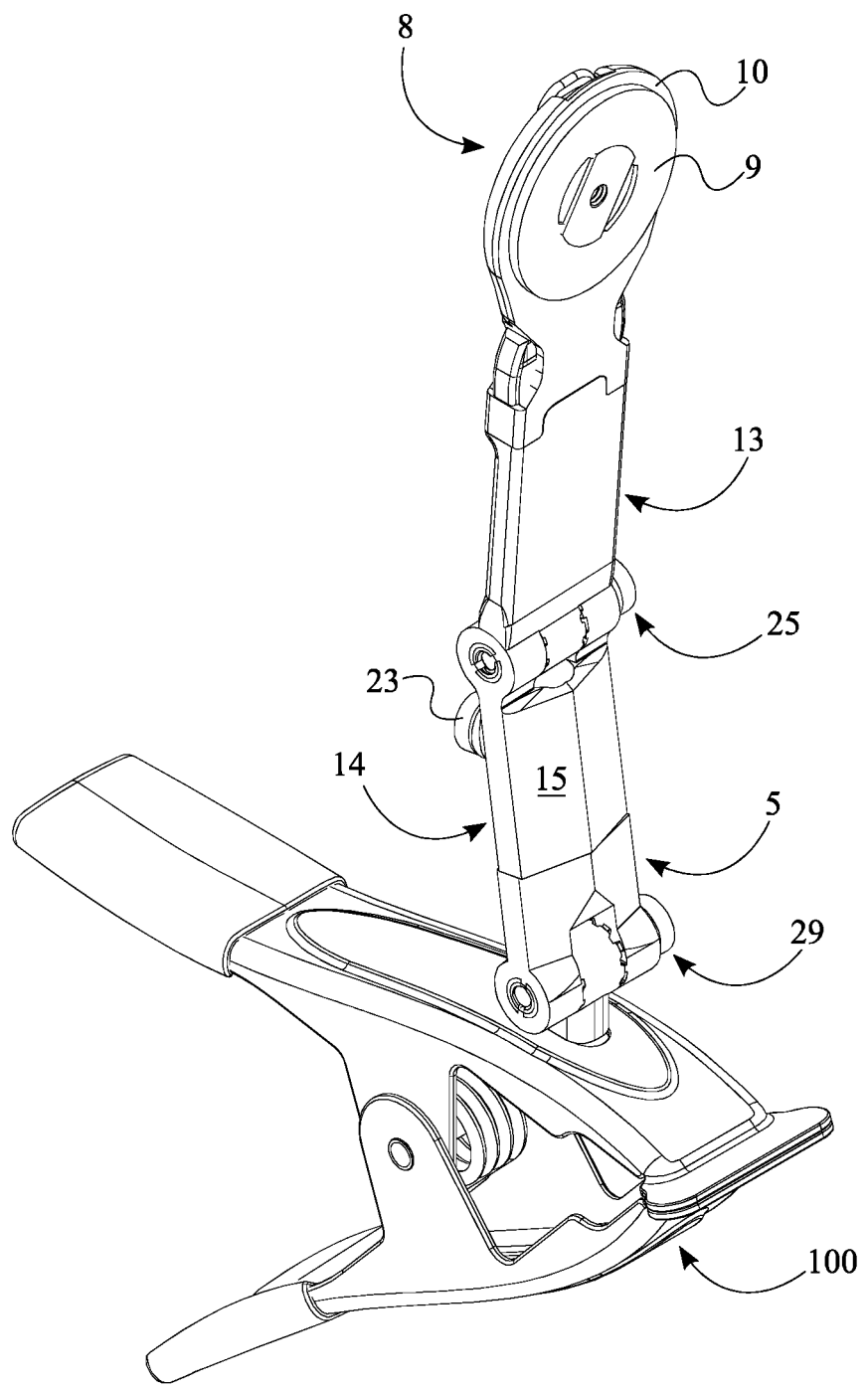
FIG. 12 is a perspective view of the present invention, wherein the mounting section is a clamp.

As shown in FIG. 14 and FIG. 15, in another embodiment of the present invention, the mounting section 1 can be a suction cup mount that is used to attach the present invention to an external surface that can be, but is not limited to, a windscreen or a dashboard of an automobile. When the suction cup mount is used, the arm-orienting base 5 will be hingedly and removably attached to the suction cup mount. As shown in FIG. 12, in another instance, the mounting section 1 will be a clamp 100. The clamp 100 can be used if the present invention is to be attached to a vent or other external surface with minimal surface area.

The device-attaching section 8 can be attached to the mobile device differently in various embodiments of the present invention. As shown in FIG. 4, if the device-attaching section 8 is attached to the mobile device through a magnetic mechanism, the present invention comprises a magnet 11 that is integrated into the attaching body 10. The magnetic properties will hold the mobile device stationary against the device-attaching section 8. If the attachment plate 9 is rotatably mounted onto the attaching body 10, the mobile device attached via the magnetic properties can be rotated as preferred.

When the present invention is being used, the following process flow is generally followed. The mounting section 1 is determined based upon the external surface the present invention is being mounted onto. As an example, if the external surface is a windshield of an automobile, the mounting section 1 will be a suction cup mount. On the other hand, if the external surface has minimal surface area, the mounting section 1 can be a clamp. Next, the device-attaching section 8 is determined based upon the mobile device that is being used with the present invention. When the mounting section 1 and the device-attaching section 8 are selected, the mobile device is attached to the device-attaching section 8. Subsequently, the first arm link 13 and the second arm link 14 are utilized to position the mobile device at a preferred position. Moreover, the rotating mechanism 18 is used to position the mobile device at a preferred angle.

Although the invention has been explained in relation to its preferred embodiment, it is to be understood that many other possible modifications and variations can be made without departing from the spirit and scope of the invention as hereinafter claimed.

What is claimed is:

1. A mobile device mount comprises:
   a mounting section for mounting on a fixed surface;
   an arm-orienting base;
   a device-attaching section;
   a first arm link;
   a second arm link;
   a rotating mechanism;
   an attachment mechanism;
   the first arm link and the second arm link each comprise a first end and a second end;
   the arm-orienting base being hingedly about a horizontal axis and removably attached to the mounting section;
   the second end of the first arm link being hingedly about the horizontal axis, connected to the first end of second arm link;
   the second end of the second arm link being rotatably connected to the arm-orienting base through the rotating mechanism for rotating the first and second arm links and the device-attaching section about a vertical axis, the rotating mechanism is placed opposite of the mounting section; and
   the device-attaching section for supporting a mobile device, being removably attached to the first end of the first arm link through the attachment mechanism.

2. The mobile device mount as claimed in claim 1 further comprises:
   the rotating mechanism comprises an engagement screw, a screw-positioning tube, and a tube-receiving channel;
   the screw-positioning tube traversing through a structural body of the arm-orienting base from a proximal end to a distal end of the arm-orienting base;
   the tube-receiving channel traversing into a structural body of the second arm link at the second end of the second arm link;
   the screw-positioning tube being concentrically aligned with the tube-receiving channel;
   the screw-positioning tube being positioned into the tube-receiving channel; and the engagement screw being positioned into the screw-positioning tube at the distal end.

3. The mobile device mount as claimed in claim 2 further comprises:
a locking screw;
a lock screw-receiving channel;
the lock screw-receiving channel perpendicularly traversing into the structural body of the second arm link in between the first end and the second end of the second arm link;
the lock screw-receiving channel being positioned perpendicular to the shaft-receiving channel; and
the locking screw being positioned into the lock screw-receiving channel.

4. The mobile device mount as claimed in claim 1 further comprises:
an arm hinging mechanism; and
the second end of the first arm link being hingedly connected to the first end of second arm link through the arm hinging mechanism.

5. The mobile device mount as claimed in claim 4 further comprises:
the arm hinging mechanism comprises a first pin, at least one first hinge knuckle, and at least one second hinge knuckle;
the at least one first hinge knuckle terminally connected at the second end of the first arm link;
the at least one second hinge knuckle terminally connected at the first end of the second arm link;
the at least one first hinge knuckle being concentrically aligned with the at least one second hinge knuckle; and
the first pin being positioned through the at least one first hinge knuckle and the at least second hinge knuckle.

6. The mobile device mount as claimed in claim 1 further comprises:
a base hinging mechanism; and
the arm-orienting base being hingedly connected to the mounting section through the base hinging mechanism.

7. The mobile device mount as claimed in claim 6 further comprises:
the base hinging mechanism comprises a second pin, at least one third hinge knuckle, and at least one fourth hinge knuckle;
the at least one third hinge knuckle terminally connected at a distal end of the arm-orienting base;
the at least one fourth hinge knuckle being mounted onto a top surface of the mounting section;
the at least one third hinge knuckle being concentrically aligned with the at least one fourth hinge knuckle; and
the second pin being positioned through the at least one third hinge knuckle and the at least one fourth hinge knuckle.

8. The mobile device mount as claimed in claim 1 further comprises:
a mounting panel;
a first strap-receiving slot;
a second strap-receiving slot;
the first strap-receiving slot being laterally connected to the mounting panel;
the second strap-receiving slot being laterally connected to the mounting panel opposite the first strap-receiving slot; and
the mounting panel being removably attached to a bottom surface of the mounting section.

9. The mobile device mount as claimed in claim 1 further comprises:
the device-attaching section comprises an attachment plate, an attaching body, and a kickstand ring;
the attachment plate being mounted onto the attaching body; and
the kickstand ring being hingedly connected to the attaching body opposite the attachment plate.

10. The mobile device mount as claimed in claim 9, wherein the attachment plate is rotatably mounted onto the attaching body.

11. The mobile device mount as claimed in claim 9 further comprises:
a magnet; and
the magnet being integrated into the attaching body.

12. The mobile device mount as claimed in claim 1 further comprises:
wherein the mounting section is a suction cup mount; and
the arm-orienting base being hingedly and removably attached to the suction cup mount.

13. The mobile device mount as claimed in claim 1, wherein the mounting section is a clamp.

14. The mobile device mount as claimed in claim 1, wherein the attachment mechanism is a side-release buckle mechanism.

* * * * *